United States Patent [19]

Calmettes

[11] Patent Number: 4,887,948
[45] Date of Patent: Dec. 19, 1989

[54] DEFORMABLE WASHER, PARTICULARLY FOR PREDETERMINING THE MINIMUM FORCE NEEDED FOR TIGHTENING A NUT OR A SCREW

[75] Inventor: Lionel Calmettes, Romorantin, France

[73] Assignee: Establissements Caillau, Issy-Les-Moulineaux, France

[21] Appl. No.: 258,657

[22] Filed: Oct. 17, 1988

[30] Foreign Application Priority Data

Nov. 3, 1987 [FR] France ............................... 87 15235

[51] Int. Cl.$^4$ ........................ F16B 31/00; F16B 31/12
[52] U.S. Cl. ........................................ 411/5; 411/10; 411/14
[58] Field of Search ..................... 411/2, 3, 5, 10, 11, 411/237, 535, 536, 544, 14; 73/761, 821

[56] References Cited

U.S. PATENT DOCUMENTS

| | | | |
|---|---|---|---|
| 3,306,154 | 2/1967 | Bailey | 411/11 |
| 3,602,976 | 9/1971 | Grube | 411/2 |
| 3,728,933 | 4/1973 | Grube | 411/5 |
| 3,948,141 | 4/1976 | Shinjo | . |

FOREIGN PATENT DOCUMENTS 1040829 11/1955 France .
2107018 4/1983 United Kingdom ................. 411/10

OTHER PUBLICATIONS

Soviet Inventions Illustrated, Sectio Mechanique, B35, Oct. 10, 1979, H4727B Q61, SU-634,023, Pospeev, V. Nov. 28, 1978.

*Primary Examiner*—Neill R. Wilson
*Attorney, Agent, or Firm*—Lewis H. Eslinger; Jay H. Maioli

[57] ABSTRACT

Deformable washer, particularly for predetermining the force needed for tightening a nut mounted on a screw or a screw cooperating with a tapped hole. The washer is provided on one of its faces, preferably the face which is meant to rest against one of the parts to be tightened, with a circular spot face, concentric to the central hole, the external diameter of which spot face is notably greater than the diameter of the central hole, while its depth is preferably near to the width of the spot faced ring. The washer further comprises, on its edge, a visible groove of which the cylindrical base is also concentric to the central hole and has a diameter at the most equal to the external diameter of the circular spot face and preferably just under said external diameter, the thickness of said groove being also as near as possible to the depth of the spot face.

3 Claims, 2 Drawing Sheets

DEFORMABLE WASHER, PARTICULARLY FOR PREDETERMINING THE MINIMUM FORCE NEEDED FOR TIGHTENING A NUT OR A SCREW

FIELD OF THE INVENTION

The present invention relates to a deformable washer, particularly for determining the minimum force to be applied for tightening a nut or a screw.

BACKGROUND OF THE INVENTION

It is important, in particular in mass production such as in the construction of motor-vehicles, to tighten nuts on the screws or screws in tapped holes with the right tightening force. Motor-driven screwing machines are often used in this type of production, and the torque developed by such machines is dependent on how they are adjusted; this torque may vary quite suddenly during use, often causing high variations of the force applied for tightening the screw or the nut, and consequently, the parts to be assembled. If the operator does not check the tightening force at the right moment, for example with a torque wrench, there is a risk that certain assemblies may be unsufficiently tightened.

SUMMARY OF THE INVENTION

It is the object of the present invention to propose a deformable washer for predetermining the minimum force needed for tightening a screw or a nut. The expected deformation of the washer only occurs once a force predetermined by the structure of the washer has been exceeded, so that, if no deformation is visible, it means that the minimum force has definitely not been reached.

Conventionally, a washer is constituted by a solid piece, generally in metal and shaped as a flat disk, of small thickness in relation to the dimensions of its periphery, and it is provided with a central hole substantially corresponding to the diameter of the screw on which it is meant to be mounted.

According to the invention, the washer is provided on one of its faces, preferably on the face designed to rest on one of the parts to be tightened, with a circular spot face, concentric to the central hole, of external diameter considerably greater than that of the central hole, and of depth preferably near to the width of the spot-faced ring. The washer further comprises, on its edge, a visible groove, the cylindrical base of which is also co-axial to the central hole. Said cylindrical base has a diameter which is at the most equal to the the external diameter of the circular spot face. The thickness of the groove is as near as possible to the depth of the spot face.

BRIEF DESCRIPTION OF THE DRAWINGS

The invention will be more readily understood on reading the following description with reference to the accompanying drawings, in which.

DETAILED DESCRIPTION OF PREFERRED EMBODIMENTS

Figure 1:
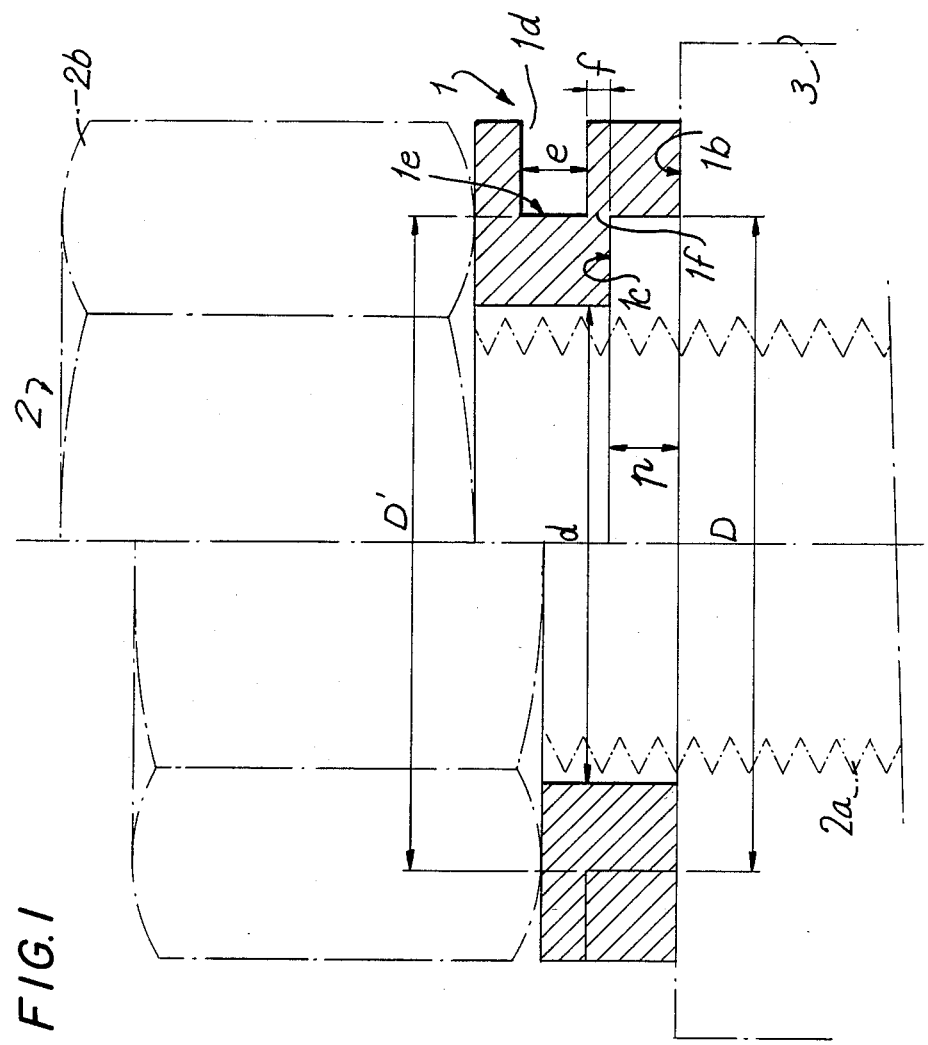
FIG. 1 is a cross-sectional view of a deformable washer according to the invention, before and after the tightening operation.

Referring now to the figures, FIG. 1 shows a washer designated by the general reference 1, which is conventionally constituted by a flat piece, such as a disk having a central hole 1a of which the diameter d is sufficient to allow the passage of the threaded stem 2a of a screw 2, illustrated in dash-and-dot lines in the figure, the head 2b of which screw can rest against the washer. Said washer 1 itself rests on a part to be tightened, as diagramatically illustrated in dash-and-dot lines and designated by reference 3.

On the lower face 1b, namely on the face in contact with the part to be tightened 3, the washer 1 is provided with a circular spot face 1c coaxial to the hole 1a. The diameter D of the spot face is quite understandably greater than diameter d of the hole 1a and, preferably considerably greater. Taking for example a circular washer, of axial section such as illustrated in FIG. 1, the diameter D of the spot face will advantageously be, in value, just under the mean diameter of the ring constituted by the washer. But it should be said, at this stage, and this will also be specified hereinafter, that the form of the external periphery of the washer 1 is not dictated by the invention, although the form of an annular disk is the most commonly used and generally the most advantageous one.

The depth p of the spot face 1c is not actually determined by the invention, but it will be preferably near to the width of the spot faced ring, namely near to half the width of the ring constituting the actual washer.

On the edge of the washer 1, there is provided a groove 1d of which the base 1e is cylindrical and co-axial to the central hole 1a as well as to the spot face 1c. The diameter D′ of said cylindrical base is at the most equal to the diameter D of the spot face 1c and preferably just under said diameter D. Moreover, the thickness e of the groove 1d is also as near as possible to the depth p of the spot face. The reasons for the above dispositions will become obvious hereinafter.

It is obvious, as can be seen in FIG. 1, that a certain thickness f of material is left between the groove 1d and the spot face 1c.

It is that thickness f which will, as demonstrated hereinafter, make it possible to predetermine the minimum force needed for tightening a screw on a part to be tightened or for tightening a nut on a screw.

Indeed, when the head 2b of screw 2 is turned, which crushes the washer 1 on the part to be locked, the upper part of the washer acts as a shearing punch with respect to the lower part. The force exerted on annular zone 1f of thickness f will cause shearing in said zone if the torque applied on the screw head is sufficient. Assuming that it is, the upper part of the washer can then fit just about exactly over the lower part, as illustrated on the lefthand side of FIG. 1, since the diameter of the cylindrical base 1e is at the most equal to that of the spot face and since the thickness e of the groove is virtually equal to the depth p of the spot face. In the case illustrated in the present invention, where the screw 2 is screwed in by a motor-driven screwing machine, said machine continues the screwing-in movement after the shearing of zone 1f of the washer. In practice, the locking torque applied by the screwing machine cannot go out of control in that last phase of the tightening operation which generally takes place over less than one turn of the shaft of the screwing machine, and it is therefore certain that, when the washer has taken up the position illustrated on the lefthand side of FIG. 1, it is tightened with a force which is at least equal to that necessary for shearing zone 1f.

On this point, it will be recalled that the force F necessary for shearing zone 1g is expressed by the formula $F = \pi DfR$ in which D is the mean diameter of the zone 1f and f its thickness, R being the strength of the material constituting the washer. Concerning the groove 1d, advantageously, its thickness e will range between 0.5 mm and 2 mm, as a function of the dimensions of the washer.

It is obvious to the reader that the present invention presents many advantages in production control, and in particular when securing assemblies of parts by means of screws and/or nuts. Indeed, when examining a washer, it is immediately noted that groove 1d is visible if the assembly is not adequately tightened. It is then possible to proceed to a further tightening operation, generally followed by a check with a dynamometric wrench. If on the contrary, groove 1d has disappeared, the operator knows that the tightening is adequate.

It is further obvious to the reader that the washer according to the invention can be placed under a screw head, such as illustrated in FIG. 1, or on the contrary, under a nut adapted to be mounted on a threaded pin. Also obvious is the fact that the washer can be mounted indifferently in one way or in the other, the shearing of zone 1f occurring regardless of what face of the washer is resting on the part to be tightened.

Figure 2:
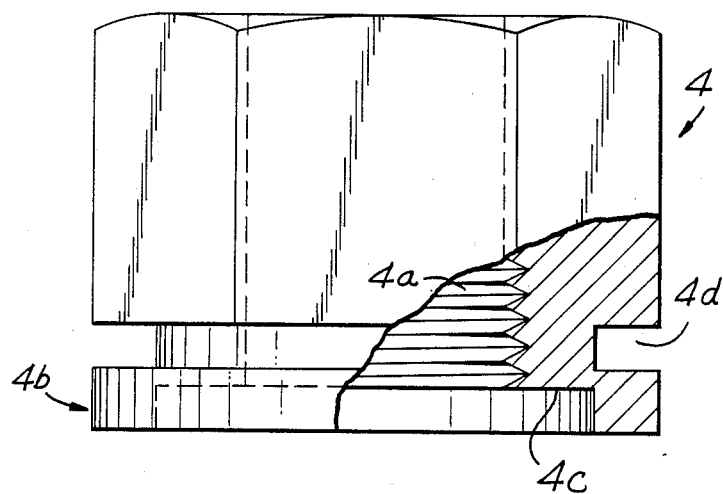
FIG. 2 is a partly torn partial cross-section of a nut fitted with a washer according to FIG. 1 and making one block therewith.
Figure 3:
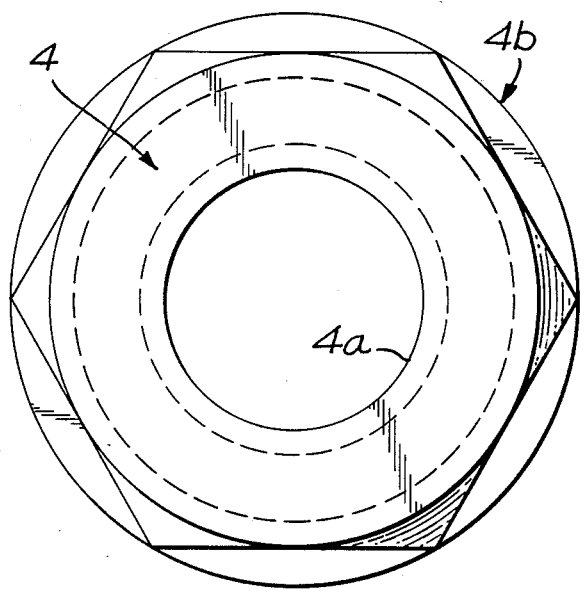
FIG. 3 is a plan view of the nut illustrated in FIG. 2.

It is now emphasized that the washer according to the present invention is easily incorporatable to a nut making a one-piece element therewith. This variant of embodiment is illustrated in FIGS. 2 and 3 which show a solid hexagon nut in which the central hole 4a is tapped.

The base 4b of the nut is provided with a spot face 4c and a groove 4d, the characteristics of which are not described since they correspond respectively to those of the spot face 1c and of the groove 1d described with reference to FIG. 1.

It is simply pointed out that the threading in the nut extends to the spot face 4c of the base 4b which latter may be a circular flange, as illustrated in the figures, or, on the contrary it may have a hexagonal shape corresponding to that of the body of nut 4.

The use of the nut 4 and its advantages are obviously similar to what has been described hereinabove, groove 4d of the nut base disappearing after adequate tightening of the nut and shearing of the zones joining the two parts constituting the base 4b.

What is claimed is:

1. A deformable washer, particularly for ensuring that a minimal force has been exerted on workpieces to be tightened by a nut mounted on a screw, or by a screw cooperating with a tapped hole, said washer being constituted by a solid piece of small thickness with respect to the dimensions of its periphery, and being provided with a central hole substantially corresponding to the diameter of the screw on which it is meant to be mounted, wherein said washer is provided on one of its faces preferably on the face intended to rest against one of the workpieces to be tightened, with a counterbore concentric to the central hole and a bearing surface surrounding said counterbore, said counterbore having a diameter notably greater than the diameter of the central hole and a depth preferably near to the width of said bearing surface, and said washer having on its edge a visible groove of which the cylindrical base is also concentric to the central hole and has a diameter at the most equal to the diameter of the counterbore and preferably just under said counterbore diameter, the thickness of said groove being as near as possible to the depth of said counterbore.

2. A nut equipped with a washer as claimed in claim 1, wherein the nut is integral with its washer and the central hole of the washer is tapped.

3. A nut as claimed in claim 2, wherein a circular flange is provided on one face of the nut, in which flange are formed the counterbore and the groove of the washer.

* * * * *